(12) United States Patent
Egami et al.

(10) Patent No.: US 7,728,066 B2
(45) Date of Patent: Jun. 1, 2010

(54) CONDUCTIVE RESIN MOLDING

(75) Inventors: Masaki Egami, Kuwana (JP); Eiichirou Shimazu, Kuwana (JP)

(73) Assignee: NTN Corporation, Osaka (JP)

( * ) Notice: Subject to any disclaimer, the term of this patent is extended or adjusted under 35 U.S.C. 154(b) by 1355 days.

(21) Appl. No.: 10/508,426

(22) PCT Filed: Mar. 18, 2002

(86) PCT No.: PCT/JP02/02562

§ 371 (c)(1),
(2), (4) Date: Sep. 16, 2004

(87) PCT Pub. No.: WO03/078528

PCT Pub. Date: Sep. 25, 2003

(65) Prior Publication Data

US 2005/0116376 A1   Jun. 2, 2005

(51) Int. Cl.
*C08G 73/10* (2006.01)
*C08F 2/08* (2006.01)
*C08F 2/44* (2006.01)

(52) U.S. Cl. ............... 524/847; 524/848; 524/849

(58) Field of Classification Search .......... 524/847, 524/848, 849
See application file for complete search history.

(56) References Cited

U.S. PATENT DOCUMENTS

| 2,849,860 A | * | 9/1958 | Lowe | ............... 60/770 |
| 3,351,495 A | | 11/1967 | Larson | |
| 3,385,736 A | * | 5/1968 | Deibert | ............... 502/4 |
| 4,510,079 A | * | 4/1985 | Kawai et al. | ............... 252/511 |

FOREIGN PATENT DOCUMENTS

| EP | 0 174 864 | * | 9/1985 |
| EP | 0425784 | | 5/1991 |
| EP | 0 784 352 A | | 7/1997 |
| EP | 1 029 893 A | | 8/2000 |
| EP | 1 061 597 A | | 12/2000 |
| EP | 1 246 285 A | | 10/2002 |
| EP | 1 253 661 A | | 10/2002 |
| GB | 2044516 | | 10/1980 |
| JP | 01-311570 A | | 12/1989 |
| JP | 02-153952 | | 6/1990 |
| JP | 03-149707 A | | 6/1991 |

(Continued)

OTHER PUBLICATIONS

International Search Report, Jun. 16, 2006.

(Continued)

*Primary Examiner*—William K Cheung
(74) *Attorney, Agent, or Firm*—Hedman & Costigan, P.C.; James V. Costigan

(57) ABSTRACT

A conductive resin molding for use in the separator of a fuel cell and its producing method in which lowering of production yield and increase of machining cost, which are the most important problems with the spread of fuel cell, can be suppressed.

The conductive resin molding is characterized by containing 1-9 vol % of high boiling point oil against the entire resin composition. Alternatively, high density expanded graphite prepared to have a specific gravity of 1.8 or above is employed as a conductive compounding agent. Alternatively, the conductive resin molding can be molded by flash flow compression molding.

16 Claims, 3 Drawing Sheets

FOREIGN PATENT DOCUMENTS

| | | | |
|---|---|---|---|
| JP | 09-249772 | | 9/1997 |
| JP | 11-354137 | A | 12/1999 |
| JP | 2000-017179 | | 1/2000 |
| JP | 2003-208907 | A | 7/2003 |
| WO | WO 9702612 | * | 1/1997 |
| WO | WO 9852240 | | 11/1998 |
| WO | WO 0049669 | | 8/2000 |
| WO | WO01/43217 | A | 6/2001 |
| WO | WO 02/093670 | A1 | 11/2002 |

OTHER PUBLICATIONS

EP Search Report dated Apr. 24, 2009.
Database WPI Week 200155. Thompson Scientific, London, GB AN 2001-502425&WO 01/43217A Jun. 14, 2001.

* cited by examiner

CONDUCTIVE RESIN MOLDING

TECHNICAL FIELD

The present invention relates to a conductive resin molding and more particularly to a conductive resin molding that can be produced with a high productivity.

BACKGROUND ART

A conductive molding is used widely as an electrode for a cell and a separator for a fuel cell.

The fuel cell taking out an electric energy by supplying fuel (reducing agent) and oxygen (oxidizing agent) successively from outside is excellent in its power generation efficiency, capable of generating electricity without using fossil fuel, and discharges only water as a discharge gas. Therefore development of the fuel cell is being made as an energy source kind to the global environment. Attention is particularly paid to a solid polyelectrolytic fuel cell which is operated at a low temperature of about 80° C. and yet capable of discharging a comparatively high current and thereby serves as a power source for household appliances and electric cars.

In the solid polyelectrolytic fuel cell, an anode is disposed at one side of a polymeric film, and a cathode is disposed at the other side thereof to form a membrane-electrode-joined assembly. An anode-side duct substrate supplying hydrogen serving as fuel is disposed at one side of this assembly and a cathode-side duct substrate supplying oxygen is disposed at the other side thereof to form a unit cell. Unit cells are layered one upon another through separators. Alternatively, the separators are layered one upon another by using them as a flow path substrate.

As the separator serving as the flow path substrate, the separator on which a flow path is formed by cutting a graphite block is known, and the separator obtained by molding an expanded graphite sheet at a high pressure is also known. As conventional separators, made of a resin material, for use in the fuel cell, the separator (international laid-open No. WO 097/02612) for the fuel cell in which the expanded graphite powder, whose particle diameter is specified, is dispersed in thermoplastic resin or thermosetting resin is known. The separator (Japanese Patent Laid-Open No. H 11-354135) for the fuel cell in which a carbon material such as expanded graphite powder is dispersed in phenol resin cured by ring opening polymerization is also known.

As a method of injection-molding ultra-high-molecular-weight polyethylene, the method of injecting it into the cavity of a die at a shearing speed of not less than $50 \times 10^3$/s and then compressing the volume of the cavity to not more than 2.0 folds of the amount of injection-molded resin (Japanese Patent Application Laid-Open No. S 51-81861) is known.

However, the conventional separators for use in the fuel cell using the resin material has a problem that they do not have sufficient conductivity, unpermeability to gases, resistance to acids, resistance to corrosion, and mechanical strength.

When the resin material is used, a large amount of a compounding agent is added to the resin material to improve conductivity. As a result, the melting viscosity of the resin composition rises outstandingly. Therefore, frequently it is difficult to mold the resin composition, the molding method is limited, and only a molding having a simple configuration is obtained. In the case of the conductive resin molding such as the separator serving as the flow path substrate, it is difficult to accomplish integral molding of a flow path. Thus it is necessary to form a complicated duct groove by post-processing such as a cutting process. Therefore the conventional conductive resin molding has a problem that the production yield of a material lowers and the machining cost increases.

Even if a small conductive resin molding can be formed from the conventional resinous material, the obtained conductive resin molding cannot be used as the separator for use in the fuel cell which withstands practical use. For example, the obtained conductive resin molding has a low denseness, is incapable of satisfying required characteristics such as gas unpermeability, electric resistance, and generates a warp. The conductive resin molding whose matrix consists of thermo setting resin is post-cured after the resin composition thereof is molded. At that time, dimensional contraction or deformation occurs. Thus it is difficult to obtain a separator having a high dimensional accuracy. In the separator for use in the fuel cell, a plurality of unit cells are laminated one upon another. Therefore if the flatness degree thereof is low, the separator cannot be used.

A problem has arisen that to make the fuel cell thin and compact, a more complicated flow path groove is demanded, but the conventional cutting process has difficulty in industrializing the formation of the complicated flow path groove in terms of cost. Another problem is that the conventional conductive resin material has a deformation such as a warp and a twist, which makes it difficult to hold dimensional accuracy.

The present invention has been made to cope with the problems. Therefore it is an object of the present invention to provide a conductive resin molding and a method of producing the conductive resin molding capable of suppressing the lowering of the production yield of a separator made of the conductive resin molding and an increase of the processing cost which are the most important problem in the spread of a fuel cell.

SUMMARY OF THE INVENTION

A first conductive resin molding of the present invention is formed by molding a resin composition containing 1 to 9 vol % of a high-boiling-point oil for an entirety of the resin composition.

The above-described high-boiling-point oil is at least one oil selected from the group consisting of fluorine-containing oil, aromatic hydrocarbon-containing oil and silicone oil.

The resin composition contains 1 to 9 vol % of the high-boiling-point oil for the entirety of the resin composition. Thereby the high-boiling-point oil suppresses the rise of the melting viscosity of the resin composition. Thereby the resin composition is excellent in its injection moldability and dimensional accuracy. Therefore without using a machining process, it is possible to easily produce the conductive resin molding having a complicated configuration.

Adding the high-boiling-point oil to resin enables filling of a conductive compounding agent at high ratio thereinto. Thus the molding obtained is excellent in its conductivity and gas barrier property. Therefore it is possible to thin a separator for use in a fuel cell. Hence it is possible to make the fuel cell lightweight and save a space.

A second conductive resin molding of the present invention is formed by molding a resin composition containing synthetic resin and a conductive compounding agent added to the synthetic resin. The conductive compounding agent is high-density expanded graphite prepared to have a specific gravity of 1.8 or more.

The specific gravity of the expanded graphite contained in the resin composition is adjusted to 1.8 or more to prepare the high-density expanded graphite allows an excellent mutual network of graphite to be formed in the resin. Therefore injection molding of the resin composition containing the compounding agent having a large specific gravity is performed. Thereby the conductive resin molding obtained is excellent in its mechanical strength and dimensional accuracy.

A third conductive resin molding of the present invention is formed by molding a resin composition, wherein the resin composition contains synthetic resin and a conductive compounding agent added to the synthetic resin; the conductive compounding agent contains a mixed conductive compounding agent of expanded graphite and carbon black having a specific surface area of 20 to 80 $m^2/g$ measured by a BET method and having an average particle diameter of 40 to 100 nm; and the conductive compounding agent contains 10 to 40 vol % of the carbon black for an entirety of the mixed conductive compounding agent.

The expanded graphite is high-density expanded graphite prepared to have a specific gravity of 1.8 or more. The expanded graphite and/or the high-density expanded graphite have an average particle diameter of 10 to 50 μm. The expanded graphite and/or the high-density expanded graphite contain iron and aluminum at less than 2500 ppm, sodium at less than 1000 ppm, magnesium and calcium at less than 500 ppm as impurities. The synthetic resin is thermoplastic resin.

It has been found that the conductivity of the resin molding can be improved outstandingly, when the resin composition contains the mixed conductive compounding agent. The conductivity-imparting performance of the carbon black having the above-described specific surface area and average particle diameter is equal to or a little inferior to that of the expanded graphite. The carbon black has a large secondary cohesive force owing to the van der Waals force. Thus by using the carbon black in combination with the expanded graphite, the mixed conductive compounding agent has a conspicuously large conductivity-imparting performance which is the capability of imparting conductivity to the synthetic resin. Therefore it is possible to decrease the addition amount of the mixed conductive compounding agent and improve injection moldability.

A fourth conductive resin molding of the present invention is formed by molding a resin composition by using a flash flow compression molding method. The resin composition contains a resin and a conductive compounding agent added to the resin.

In the present invention, the flash flow means a state in which finely divided particles of a molten resin composition are injected in the form of spray, i.e., the flash flow means a spray-injected state. The flash flow compression molding method means a method of compressing the resin composition filled into a die cavity to form the resin composition into a predetermined configuration by the flash flow.

By molding the resin composition by using the flash flow compression molding method, even the conductive resin composition containing the compounding agent at a high ratio can be injected into the cavity of a molding die. Thus injection molding can be accomplished.

A method of the present invention of producing a conductive resin molding includes the steps of obtaining a conductive resin composition by adding a conductive compounding agent to a resin; and molding the conductive resin composition into a predetermined configuration. The above-described resin composition contains 1 to 9 vol % of high-boiling-point oil for an entirety of the resin composition, high-density expanded graphite prepared to have a specific gravity of 1.8 or more or a mixed conductive compounding agent of expanded graphite and carbon black having a specific surface area of 20 to 80 $m^2/g$ measured by a BET method and an average particle diameter of 40 to 100 nm. The molding step is performed by an integral molding method in which a machining process is not used.

The above-described integral molding method is injection molding, injection compression molding, injection press; injection molding method, compression molding; or transfer molding.

In another method of the present invention of producing a conductive resin molding, the process of molding a resin composition is performed by using a flash flow compression molding method of injecting and filling the resin composition into a cavity of a molding die in a flash flow state.

In the flash flow compression molding method, a shearing speed at a time of injection and filling of the above-described resin composition into the cavity is set to $5 \times 10^3$/s or more. The above-described resin composition is compressed after the resin composition is injected and filled into the cavity.

After the resin is filled into the die, the volume of the cavity of the die is compressed by using the flash flow compression molding method. Thereby fusion of molten fine particles can be accomplished and the obtained molding is dense. In this method, by closing a valve provided on a nozzle, it is possible to prevent aback flow of the resin from a die. In this method, a flow-caused internal stress is not generated or warp is hardly generated.

The conductive resin molding of the present invention is a separator for use in a solid polyelectrolytic fuel cell.

DETAILED DESCRIPTION OF THE PREFERRED EMBODIMENT

Figure 1:
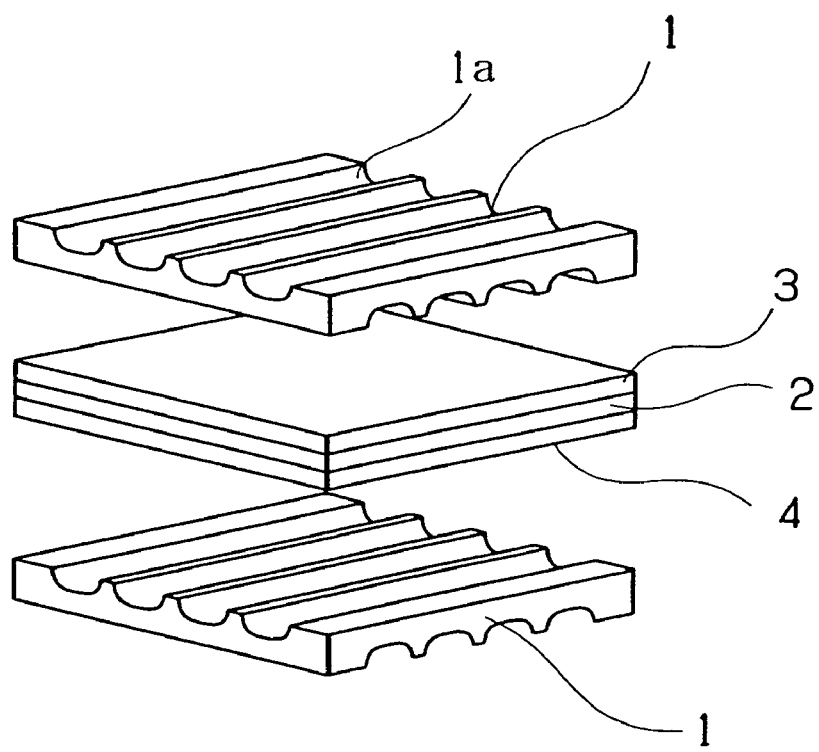
FIG. 1 is a perspective view showing a separator used as a substrate for a flow path for use in a solid polyelectrolytic fuel cell and the construction concept of the solid polyelectrolytic fuel cell in which the separator is used.

As an example to which a conductive resin molding is applied, FIG. 1 shows an example of a separator for use in a fuel cell. FIG. 1 is a perspective view showing a separator serving as a flow path substrate for use in a solid polyelectrolytic fuel cell and the construction concept of the solid polyelectrolytic fuel cell using the separator.

A sell stack is obtained as an assembly by alternately layering a plurality of separators 1 for a fuel cell and a plurality of membrane-electrode-joined assemblies (MEA) each having an anode 3 disposed on a front surface of a solid polyelectrolytic film 2 and a cathode 4 disposed on a rear surface thereof. The separators 1, 1 for use in a fuel cell are disposed at both sides of the membrane-electrode-joined assembly (MEA) with the separators 1, 1 sandwiching the membrane-electrode-joined assembly (MEA) therebetween.

Groove portions 1a are formed on a surface of the separator 1 for the fuel cell to secure the flow path of hydrogen gas or air.

First through fourth conductive resin moldings of the present invention can be suitably used as the separator for the fuel cell and are obtained by molding a resin composition containing a resin and a compounding agent. Both thermoplastic resin and thermosetting resin can be used. The thermoplastic resin which is excellent in performance in integral molding is particularly suitable for the present invention.

As the thermoplastic resin, it is possible to exemplify polyethylene, polypropylene, polymethylpentene, polystyrene, polymethyl methacrylate, polyethylene terephthalate, polybutylene terephthalate, polysulfone, polyether sulfone, polyphenylene sulfide, polycarbonate, polyoxymethylene, polyamide, polyimide, polyether imide, polyamideimide, polybenzimidazole, polyether ketone, polyether ether ketone, polyarylate, ABS resin, AS resin, and syndiotactic polystyrene. The thermoplastic resin can be used singly or in combination. Of the above-described thermoplastic resins, the polypropylene is preferable because it is resistant to chemicals and heat.

As the thermosetting resin, it is possible to exemplify phenol resin, melamine resin, silicone resin, epoxy resin, urea resin, alkyd resin, furan resin, polyurethane resin, polycarbodiimide resin. The thermosetting resin can be used singly or in combination.

As compounding agents that can be used for the first conductive resin molding of the present invention, it is possible to use fillers, reinforcing agents, and modifying agents that are added to the above-described resin and capable of imparting excellent conductivity, unpermeability to gases, resistance to acids, resistance to corrosion, and mechanical strength to the first conductive resin molding.

Of compounding agents that can be used in the present invention, high-boiling-point oil is an essential compounding agent as a modifying agent for improving the moldability of the resin composition. A conductive compounding agent which imparts conductivity to the conductive resin molding is also added to the resin.

High-boiling-point oil which is resistant to heat and generates a small amount of a volatile component at a molding time can be used for the first conductive resin molding of the present invention. It is possible to use the high-boiling-point oil which has a boiling point not less than 200° C. and preferably not less than 250° C. and is liquid at a molding time. It is preferable that the high-boiling-point oil has a high plasticizing efficiency at the molding time and is excellent in its compatibility with the resin composition or is excellent in its affinity for the conductive compounding agent. Moldability of the resin composition containing the high-boiling-point oil having these properties can be improved in an integral molding operation, even though the resin composition contains compounding agents at a high ratio.

As the high-boiling-point oil, it is possible to exemplify fluorine-containing oil, aromatic hydrocarbon-containing oil such as phenyl ether, and silicone oil.

The fluorine-containing oil is an oily substance having a perfluoropolyether structure ($-CF_2-O-$). Oil having a kinematic viscosity of $(0.1$ to $20) \times 10^{-4}$ m$^2$/sec at 25° C. can be used. More specifically, the fluorine-containing oil is compounds indicated by the following formulas in which n and m are integers:

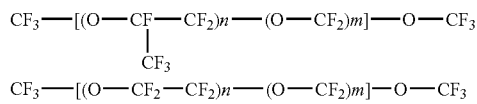

The aromatic hydrocarbon-containing oil is compounds having aromatic single rings or aromatic fused rings or compounds in which these rings are linked to each other with linking groups like ether linkage. As the aromatic hydrocarbon-containing oil, it is possible to exemplify polyphenyl ether, diphenyl ether, and alkylbenzene. Of these compounds, polyphenyl ether oil having not less than three benzene rings is particularly preferable because it is resistant to heat and generates a very small amount of a volatile component at the molding time.

As the silicone oil, it is possible to use both so-called straight silicone oil such as dimethyl silicone oil and methylphenyl silicone oil and so-called modified silicone oil such as alkyl modified silicone oil and aralkyl modified silicone oil. Of these silicone oils, silicone oil in which the side chain shows non-reactivity is preferable because it does not prevent connection between conductive compounding agents and is capable of maintaining an excellent conductivity. More specifically, dimethyl silicone oil and methylphenyl silicone oil both having methyl siloxane which is unreactive straight silicone oil is preferable. The kinematic viscosity of the silicone oil at 25° C. is favorably not less than $1 \times 10^{-4}$ m$^2$/sec and more favorably $(1-10) \times 10^{-4}$ m$^2$/sec because it generates a small amount of a volatile component at the molding time.

It is possible to use fluorine modified silicone oil in which the methyl group of the side chain is replaced with fluoroalkyl group. Trifluoropropyl group can be exemplified as the fluoroalkyl group. The fluorine modified silicone oil is superior to the above-described silicone oil in its lubricating property. Thus the fluorine modified silicone oil is excellent in the release property at the molding time. The fluorine modified silicone oil can be used in combination with the dimethyl silicone oil and the methylphenyl silicone oil.

The resin composition contains 1 to 9 vol % of the high-boiling-point oil for the entire resin composition containing the high-boiling-point oil. If the resin composition contains less than 1 vol % of the high-boiling-point oil, it is impossible to allow the resin composition to have a low viscosity at the molding time. Thus it is difficult to mold the resin composition. If the resin composition contains more than 9 vol % of the high-boiling-point oil, the mechanical strength of the separator for the fuel cell and the molding accuracy deteriorate or it is difficult to supply a die with a material to be molded. Consequently injection molding cannot be accomplished.

As the conductive compounding agent that can be used for the first conductive resin molding of the present invention, it is possible to use artificial graphite, natural graphite, conductive carbon black such as acetylene black, Ketjen black, and the like, coke powder, glassy carbon formed by carbonizing phenol resin or furan resin, meso-carbon graphite formed by heat-treating pitch, carbon powder derived from such as carbon fiber, conductive ceramics, and metal powder.

Of the above-described conductive compounding agents, the artificial graphite and the natural graphite are preferable because they are stable in conductivity-imparting efficiency. These conductive compounding agents can be used in combination. These conductive compounding agents are capable of imparting a mechanical strength to the conductive resin molding without deteriorating conductivity thereof by using these conductive compounding agents in combination with a fibrous material such as carbon fiber, whisker-shaped conductive ceramic or graphite.

As compounding agents that can be used in combination with the above-described conductive compounding agents, it is possible to use inorganic fillers such as whiskers such as silicon carbide whisker, silicon nitride whisker, potassium titanate whisker; mica, and talc; and these inorganic fillers silver-plated to allow them to be conductive.

The mixing ratio of the conductive compounding agents is variable according to the kind and application of the conductive resin molding. For example, it is possible to exemplify a resin composition containing the resin as its matrix and 70 to 90 vol % of the conductive compounding agent. If the content of the conductive compounding agent is less than 70 vol %, the conductive resin molding has a deteriorated conductivity. If the content of the conductive compounding agent is more than 90 vol %, the conductive resin molding has a deteriorated mechanical strength and the resin composition has a deteriorated fusing moldability. Other compounding agents may be used in combination with the conductive compounding agent within a range in which they do not deteriorate the effect of the present invention.

The conductive compounding agent which is contained in the resin composition which can be used for the second and third conductive resin molding of the present invention is described below.

A first conductive compounding agent is high-density expanded graphite prepared to have a specific gravity of 1.8 or more.

The expanded graphite is obtained by treating graphite such as natural graphite, kish graphite, thermally decomposed graphite crystallized to a high extent with a treating solution containing sulfuric acid, nitric acid or a mixed solution of sulfuric acid and nitric acid and hydrogen peroxide added thereto, rinsing the graphite, and heating it rapidly to expand the crystal of the graphite in the direction of its C-axis. As the expanded graphite, EP and KEX produced by Nippon Kokuen Inc. are commercially available.

The above-described conventional expanded graphite has an apparent density of about 0.1 and a specific gravity adjusted to about 1.0. In the present invention, the expanded graphite is used by adjusting the specific gravity thereof to 1.8 or more, favorably to 1.9 or more, and more favorably to 2.0 or more. After the commercially available expanded graphite having an apparent density of about 0.1 is compression-molded or compressed with a roll or the like, the expanded graphite is reduced to powder. Alternatively the high-density expanded graphite having a specific gravity of 1.8 or more can be formed by mixing the conventional expanded graphite with resin at a predetermined ratio and then by utilizing a pressure applied to the resin composition containing the expanded graphite and the resin in a kneading operation which is performed by using a fusing kneader such as a biaxial kneader. Alternatively the high-density expanded graphite having a specific gravity of 1.8 or more can be formed by utilizing a pressure applied to the resin composition at the molding time.

The high-density expanded graphite having a specific gravity of 1.8 or more has an improved conductivity because gaps between graphite layers are compressed and the graphite layers overlap each other. The upper limit of the specific gravity of the high-density expanded graphite is less than the specific gravity of 2.25 of graphite. If the specific gravity of the high-density expanded graphite is less than 1.8, the resin molding containing the high-density expanded graphite is mechanically brittle and thinner parts thereof are liable to be broken at the time of release thereof from an injection molding die. Consequently it is impossible to reliably form a gas duct having a complicated pattern necessary for the conductive resin molding to be used as the separator for use in the fuel cell. If the specific gravity of the high-density expanded graphite is less than 1.8, to enhance the gas barrier performance and mechanical strength of the conductive resin molding, the separator is thickened. Consequently the fuel cell is necessarily large and its weight increases. Further the loss of an electric power consumed by the separator is necessarily large.

A second conductive compounding agent is a mixed conductive compounding agent consisting of a mixture of the expanded graphite and the carbon black. The carbon black to be used in the present invention has a specific surface area of 20 to 80 $m^2/g$ measured by BET method and an average particle diameter of 40 to 100 nm and preferably 45 to 70 nm. The average particle diameter of the carbon black means the average of diameters of primary particles thereof.

If the specific surface area of the carbon black is less than 20 $m^2/g$ or its average particle diameter is more than 100 nm, it has an insufficient secondary cohesive force and thus a low capability of forming an cable way in combination with the expanded graphite and is inferior in conductivity-imparting performance. Because the carbon black has the form of nano-particles, it has a much larger thickening effect than the expanded graphite and is inferior to the expanded graphite in injection moldability. On the other hand, if the specific surface area of the carbon black is more than 80 $m^2/g$ or its average particle diameter is less than 40 nm, its structure grows outstandingly. Frequently because the structure of the carbon black is composed of an aggregate of particles thereof, when only the carbon black is used as the conductive compounding agent, the addition of a small amount of the carbon black to the resin allows the conductive resin molding to have a high conductivity. When the carbon black is used in combination with the expanded graphite, the mixture of the carbon black and the expanded graphite has an outstandingly high thickening effect. Thus the use of even a small amount thereof causes the resin composition to have very low kneading performance and moldability. Consequently kneading and molding cannot be accomplished.

The second conductive compounding agent contains 10 to 40 vol % of the carbon black having the above-described properties for the entire mixed conductive compounding agent. If the vol % thereof is less than 10, the second conductive compounding agent does not have a conductivity-improving effect. If the vol % thereof is more than 40, the resin composition has a very large thickening effect, when the second conductive compounding agent is added to synthetic resin. Thus it is very difficult to perform injection molding operation.

It is preferable that the expanded graphite or the high-density expanded graphite which can be used in the present invention has an average particle diameter of 10 to 50 μm. The expanded graphite having an average particle diameter of 10 to 50 μm is effective for keeping a favorable balance between moldability and conductivity of the resin composition, when the expanded graphite is used in combination with conductive agents other than the carbon black used for the above-described mixed conductive compounding agent. It is preferable that 80 vol % of the entire particles of the expanded graphite has an average diameter in the range of 4 to 60 μm.

If the average particle diameter of the expanded graphite is more than 50 μm and the specific gravity thereof is not adjusted to not less than 1.8, it is difficult to uniformly disperse the conductive agent in the resin. Further because the diameter of particles of the expanded graphite is large, a large quantity of heat is generated in the neighborhood of a gate of an injection molding die at an injection molding time. Consequently defective molding such as blisters and voids are liable to be generated.

If the average particle diameter is less than 10 μm, the conductive resin molding has a low conductivity. Consequently it is necessary to increase the compounding amount of the conductive agent, which leads to deterioration of injection moldability. Because the expanded graphite has a high bulk specific gravity, the expanded graphite has a low handleability. Thus it is difficult to accomplish uniform dispersion of the expanded graphite by kneading. Consequently the conductive resin molding has a nonuniform conductivity.

Of metal impurities contained in the expanded graphite, iron and aluminum dilute from the separator in dependence on a operation condition of the fuel cell and deteriorate an ionic resin used for an electrolytic film and catalysts supporter. Since cations of iron and aluminum have large valences, only a slight amount of dilution thereof affects the fuel cell adversely. Since sodium, magnesium, and calcium are large in the order of ionization tendency, the ions thereof are apt to dilute from the fuel cell. Thus the output characteristic of the fuel cell is unstable. Therefore it is preferable that the content of the metal impurities contained in the expanded graphite is small. It is preferable to use the expanded graphite containing iron and aluminum at less than 2500 ppm, sodium at less than 1000 ppm, magnesium and calcium at less than 500 ppm as impurities.

As the conductive compounding agent which can be used in the present invention, the above-described conductive compounding agents can be used singly or in combination. It is preferable that the second conductive resin molding contains the high-density expanded graphite and that the third conductive resin molding contains the high-density expanded graphite and/or the second conductive compounding agent.

When the conductive resin molding of the present invention is used as the separator for the fuel cell, it is possible to use fillers, reinforcing agents, modifying agents in combination with the above-described conductive compounding agents if the fillers, the reinforcing agents, the modifying agents are capable of imparting unpermeability to gases, resistance to acids, resistance to corrosion, and mechanical strength to the conductive resin molding within the range in which these compounding agents do not deteriorate the moldability and conductivity of the conductive resin molding.

As compounding agents that can be used in combination with the conductive compounding agent, it is possible to exemplify carbon black having a specific surface area out of the range of 20 to 80 $m^2/g$ measured by BET method and out of the range of an average particle diameter of 40 to 100 nm, carbon fiber, graphite whisker, conductive ceramic fiber, and whisker.

Of these compounding agents, the carbon fiber is capable of improving the mechanical strength. Particularly the carbon fiber which has a high graphitization degree or is curly and coiled can be effectively utilized because these carbon fibers hardly lower the conductivity.

As the mixing ratio of the conductive compounding agents, it is possible to exemplify a resin composition containing the resin as its matrix and 40 to 90 vol % of the conductive compounding agent. If the content of the conductive compounding agent is less than 40 vol %, the conductive resin molding has a deteriorated conductivity. If the content of the conductive compounding agent is more than 90 vol %, the conductive resin molding has a deteriorated mechanical strength and the resin composition has a deteriorated fusing moldability. Other compounding agents may be used in combination with the conductive compounding agent within a range in which they do not deteriorate the effect of the present invention.

The first through third conductive resin moldings of the present invention are obtained by uniformly mixing the resin, the high-boiling-point oil, and the conductive compounding agent to form a pellet, mixed powder or mixed granulated powder, and thereafter molding them by using an integral molding method.

After the resin, the compounding agent, and the high-boiling-point oil are uniformly mixed with one another with a kneader, a ball mill or a Henschel mixer, a mixture is pelletized by using a conventional method with a roll, a biaxial extruder or a continuous kneader (KCK). The high-boiling-point oil may be added to the mixture of the resin and the compounding agent while fusing kneading is being performed. Similarly to the manner used in pelletizing the mixture, the mixed powder or the mixed granulated powder is obtained by uniformly mixing the resin, the compounding agent, the high-boiling-point oil with one another with the kneader, the ball mill or the Henschel mixer. Alternatively the mixed powder or the mixed granulated powder is obtained by pelletizing the mixture and pulverizing it It is favorable to use injection molding, injection compression molding, injection press; injection molding method, compression molding; or transfer molding as the integral molding method. The injection press or the injection molding method is most favorable because these methods are superior in productivity.

Figure 2:
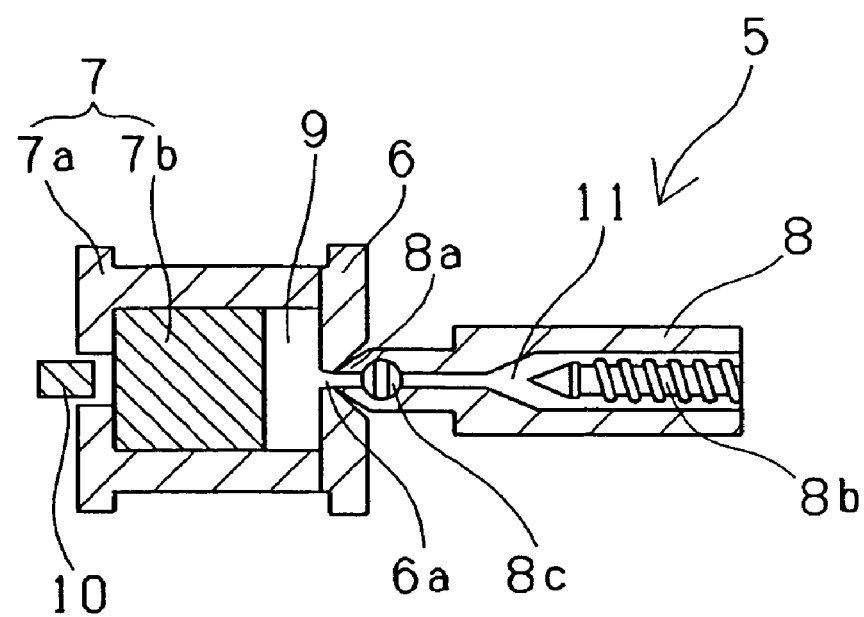
FIG. 2 is a construction view of a flash flow compression molder.

A flash flow compression molding method characterizing a fourth conductive resin molding of the present invention is described below with reference to FIG. 2. FIG. 2 is a construction view of a flash flow compression molder.

A flash flow compression molder 5 is constructed of a stationary-side template 6, a movable-side plate 7, and an injection cylinder 8. The tip of a nozzle portion 8a of the injection cylinder 8 is butted at a gate portion 6a of the stationary-side template 6. The movable-side plate 7 is constructed of a movable-side fixed plate 7a and a movable-side middle plate 7b movable forward and rearward inside the movable-side fixed plate 7a. The stationary-side template 6 and the movable-side plate 7 form a cavity 9 whose volume is adjusted by a forward and rearward movement of the movable-side middle plate 7b. The injection cylinder 8 has a screw 8b, the nozzle portion 8a provided at the tip thereof, and a closing valve 8c which is provided on the nozzle portion 8a and adjusts a shearing speed when the resin composition is injected into the cavity 9. The flash flow compression molder 5 has a projected pin 10.

Figure 3:
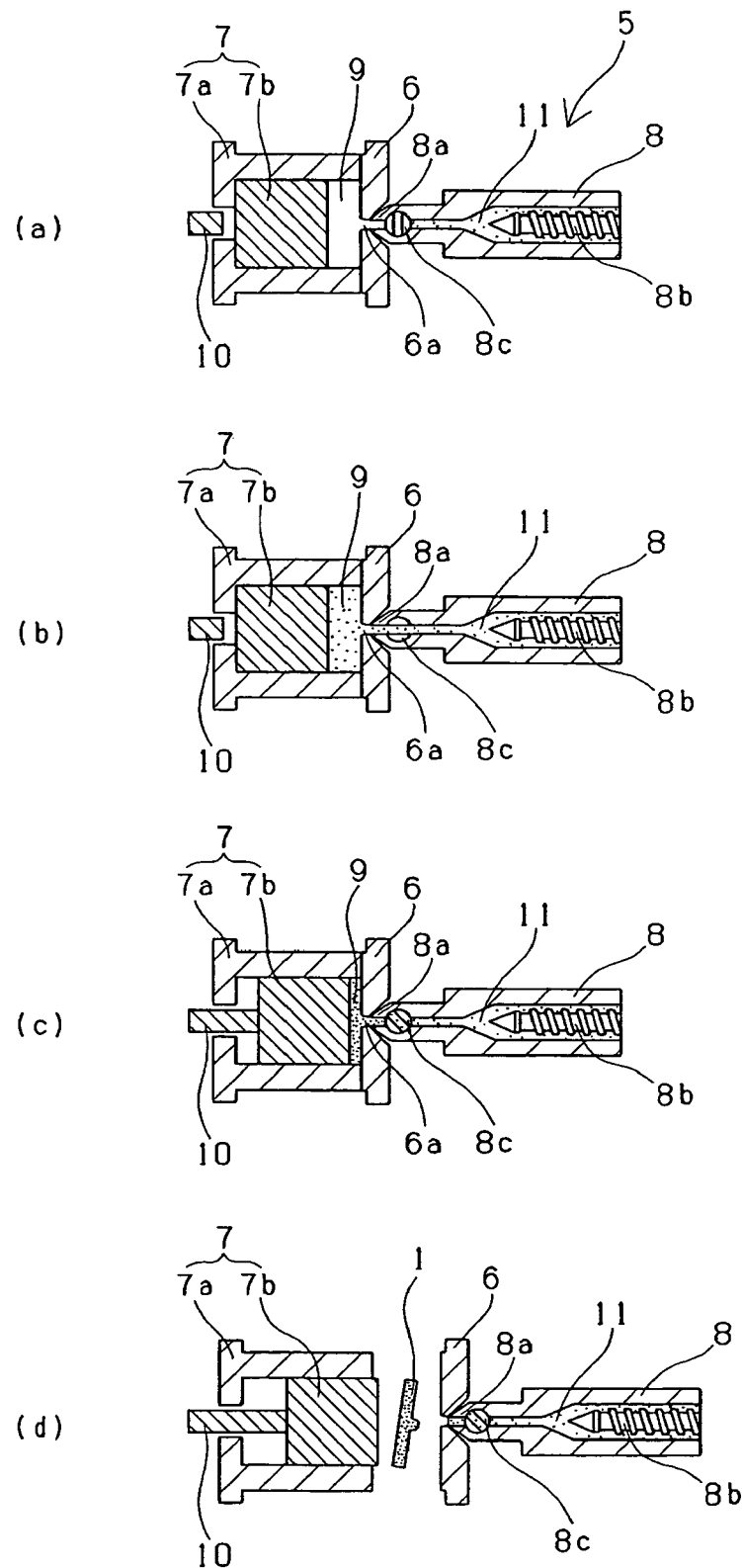
FIG. 3 is process views for explaining a flash flow compression molding method.

The method of forming the separator for the fuel cell by using the flash flow compression molder is described below with reference to FIG. 3. FIG. 3 (a) through FIG. 3 (d) are process views for explaining the flash flow compression molding method.

Initially a resin composition containing the thermoplastic resin of the like and the conductive compounding agent mixed there with uniformly is used. After the resin and the compounding agent are mixed with each other uniformly with a kneader, a ball mill or a Henschel mixer, the mixture is pelletized by using a conventional method with a biaxial extruder or the like or the mixture is pulverized to form mixed powder.

Thereafter a resin composition 11 is filled into the injection cylinder 8 of the flash flow compression molder 5, with the closing valve 8c closed (FIG. 3 (a)).

Simultaneously with the start of an injection molding operation, the closing valve 8c is opened, and the screw 8b is moved forward to obtain a predetermined shearing speed so that the resin composition 11 is injected into the cavity 9 within several seconds (FIG. 3 (b)). The injection can be carried out by using a plunger-using method.

The volume of the cavity 9 is made larger than the configuration of the separator for the fuel cell by moving the movable-side middle plate 7b rearward with respect to the stationary-side template 6.

The volume of the cavity 9 is variable according to an injection amount of the resin composition. Thereafter the inside of the cavity 9 is evacuated so that a resistance to the injection and filling of the resin composition is decreased and oxidation-caused deterioration of the resin composition 11 is controlled.

A shearing speed γ in injecting the resin composition into the cavity 9 is set to not less than $5 \times 10^3$/s. When the shearing speed is not less than $5 \times 10^3$/s, the resin composition 11 can be uniformly dispersed in the cavity 9.

Supposing that the configuration of the tip of the nozzle portion 8a is circular, the injection amount is Q is (ml/s), and the radius r of the tip of the nozzle portion 8a is r (cm), the shearing speed γ is shown by $\gamma = 4Q/\pi r^3$. Thus the shearing speed γ can be controlled by setting injection amount Q and the radius r of the tip of the nozzle portion 8a.

When the cavity is filled with the resin composition 11, with the closing valve 8c kept closed, and the movable-side middle plate 7b is moved forward with respect to the stationary-side template 6 to compress the resin composition 11 until the predetermined thickness of the resin composition 11 becomes equal to that of the conductive resin molding (FIG. 3 (c)).

After the resin composition 11 is cooled sufficiently, the movable-side middle plate 7b and the stationary-side template 6 are separated from each other. Thereby the separator 1 for the fuel cell to be used as the conductive resin molding is obtained by using the projected pin 10 (FIG. 3 (d)).

The obtained separator 1 for the fuel cell is capable of containing a large amount of the conductive compounding agent, the separator 1 for the fuel cell is excellent in its conductivity. Because the resin composition 11 is compression-molded, the obtained separator 1 is excellent in its gas unpermeability and mechanical strength. By using the separator, it is possible to obtain a high-performance solid polyelectrolytic fuel cell.

Examples 1 Through 5

In the examples 1 through 5, the first conductive resin molding is used as the separator for use in the fuel cell. At the compounding ratios (unit: vol %) shown in table 1, the synthetic resin, the compounding agent, and the high-boiling-point oils were mixed with one other and kneaded by using a Henschel mixer and a biaxial kneader to pellet the resin composition. As the synthetic resin used as the matrix of the resin composition, J-6083HP (thermoplastic polypropylene resin) produced by Idemitsu Sekiyu Kagaku Inc. was used. As the conductive compounding agent A (indicated as conductive agent A in tables) used as one compounding agent, artificial graphite KS44 produced by LONZA Inc. was used. As the conductive compounding agent B (indicated as conductive agent B in tables) used as another compounding agent, Donacarbo S-210 produced by Dainippon Inc. was used. Of the high-boiling-point oils, as the fluorine-containing oil, FOMBLIN YR produced by AUSIMONT Inc. was used. As the phenyl ether oil, S-3101 which is polyphenyl ether oil produced by Matsumura Sekiyu Inc. was used. As the silicone oil, KF965-1000 produced by Shinetsu Silicone Inc. was used.

The separator having the configuration shown in FIG. 1 was formed by injection-molding the resin composition by using a die. As the injection molding conditions, the temperature of the resin was set to 240° C., and the temperature of the die was set to 160° C. As the configuration of the obtained separator for use in the fuel cell, the thickness, the length, and the depth of the gas duct were set to 2 mm, 180 mm×180 mm, and 0.7 mm respectively.

As a result of heat treatment of the separator at 100° C., neither warp nor deformation was detected.

Table 1 shows the melting viscosity of the pelletized composition of each example measured at 240° C. and at a shearing speed of $10^2$/s and the resistivity of the separator, obtained by the injection molding, which was measured at an applied electric current of 100 mA by a four-tip probes method.

Comparison Examples 1 Through 5

Table 2 shows the results of measurement of the melting viscosity and resistivity of the conductive resin molding of each of the comparison examples 1 through 5. The kneading method, the mixing method, the condition, and the injection molding condition of the comparison examples were similar to those of the examples.

In the comparison example 1, although attempts were made to prepare a pellet containing the same components as those of the conductive resin molding of the example 1 by using LUCANT HC10 which is poly a olefin oil produced by Mitsui Kagaku Inc and injection-mold the pellet to form a separator for a fuel cell, much gas was generated in the kneading operation performed by using a biaxial kneader. Thus the resin composition could not be pelletized.

In the comparison example 2, a pellet could be formed but the obtained pellet could be poorly charged into an extruder. Thus injection molding could not be accomplished.

In the comparison example 3, the melting viscosity was so high that injection molding could not be accomplished.

In the comparison example 4, injection molding could be accomplished. But the melting viscosity was high, the amount of the flow component was small, and was hence inferior in the flow performance. Therefore it was difficult to perform injection molding.

In the comparison example 5, there was no problem in the moldability. But a resistivity not more than $10^{-2}$ Ω·cm order demanded for a solid polyelectrolytic separator could not obtained.

TABLE 1

| | Example | | | | |
|---|---|---|---|---|---|
| | 1 | 2 | 3 | 4 | 5 |
| Matrix | 25 | 29 | 21 | 10 | 10 |
| Conductive agent A | 70 | 50 | 70 | 85 | 85 |
| Conductive agent B | — | 20 | — | — | — |
| Fluorine-containing oil | — | — | — | 5 | — |
| Polyphenyl ether oil | 5 | 1 | 9 | — | — |
| Silicone oil | — | — | — | — | 5 |
| Resistivity, Ω·cm | $2 \times 10^{-2}$ | $1 \times 10^{-2}$ | $1 \times 10^{-2}$ | $9 \times 10^{-3}$ | $9 \times 10^{-3}$ |
| Melting viscosity, Pa·s | 6500 | 7900 | 6000 | 15000 | 16000 |

TABLE 2

| | Comparison example | | | | |
|---|---|---|---|---|---|
| | 1 | 2 | 3 | 4 | 5 |
| Matrix | 30 | 15 | 4.5 | 20 | 69.5 |
| Conductive agent A | 70 | 70 | 50 | 80 | 30 |
| Conductive agent B | — | — | 45 | — | — |
| Fluorine-containing oil | — | 15 | — | — | — |
| Polyphenyl ether oil | — | — | — | — | — |
| Silicone oil | — | — | 0.5 | — | 0.5 |
| Poly-α-olefin oil | 5 | — | — | — | — |
| Resistivity, Ω·cm | — | — | — | $7 \times 10^{-3}$ | $9 \times 10^{0}$ |
| Melting viscosity, Pa·s | — | 5800 | — | 19000 | 200 |

The first conductive resin molding of the present invention is excellent in its productivity and preferable as the separator for use in the fuel cell, because the resin composition is excellent in its moldability and can be formed by the integral molding method, which eliminates the need for a machining process to be performed as post-processing.

Particularly, the high-boiling-point oil is at least one oil selected from the group consisting of the fluorine-containing oil, the aromatic hydrocarbon-containing oil and the silicone oil. Thus the first conductive resin molding sufficiently satisfies the characteristics of conductivity, unpermeability to gases, resistance to acids, resistance to corrosion, and mechanical strength demanded for the separator. Because the conductive resin molding is produced by the integral molding method, it is possible to reduce the yield of the material thereof and the production cost.

Examples 6 Through 13

In the examples 6 through 13, the second and third conductive resin moldings are used as the separator for use in the fuel cell. At the compounding ratios (unit: vol %) shown in table 3, the synthetic resin, the expanded graphite, and other components were mixed with one other by using a Henschel mixer, and the mixture was pelletized by using a biaxial kneader. As the synthetic resin, PP J-6083HP produced by Idemitsu Sekiyu Kagaku Inc. and Zarek S104 produced by Idemitsu Sekiyu Kagaku Inc. were used. As the compounding agents, KEX produced by Nippon Kokuen Inc., EP which is expanded graphite produced by Nippon Kokuen Inc., conductive carbon black #3030B produced by Mitsubishi Kagaku Inc., and EC-DJ600 (conductive carbon black) produced by Lion Akuzo Inc. were used. The mixing ratio of each compounding agent was determined by computing the true specific gravity thereof at the compounding time. The KEX produced by Nippon Kokuen Inc. contained iron, aluminum, sodium, magnesium, and calcium at less than 400 ppm, less than 400 ppm, less than 160 ppm, less than 40 ppm, and less than 40 ppm respectively. The EP which is the expanded graphite produced by Nippon Kokuen Inc. contained iron, aluminum, sodium, magnesium, and calcium at less than 2000 ppm, less than 2000 ppm, less than 800 ppm, less than 200 ppm, and less than 200 ppm respectively.

The value of the specific gravity of the expanded graphite shown in the column of "characteristic" was computed from the specific gravity of the molding. Table 3 also shows the property of each compounding agent.

The separator having the configuration shown in FIG. 1 was formed by injection-molding the resin composition by using a die. As the injection molding conditions, the temperature of the PP J-6083HP used as the matrix resin was set to 270° C. The temperature of the S104 used as the matrix resin was set to 290° C. The injection molding was performed by setting the temperature of the die to 150° C. As the configuration of the obtained separator for use in the fuel cell, the thickness, the length of one side, and the depth of the gas duct were set to 2 mm, 180 mm, and 0.7 mm respectively.

As a result of heat treatment of the separator at 100° C., neither warp nor deformation was detected. Table 3 shows the measured resistivity of each separator obtained by the injection molding and the melting viscosity of the pellet of each example measured at a shearing speed of $10^3$/s and at the temperature of the resin of the pellet when each pellet was injection-molded.

Comparison Examples 6 Through 11

At the compounding ratio shown in table 4, attempts were made to prepare a separator for a fuel cell in the same condition as that of the example 6. Similarly to the example 6, the compounding ratio of each compounding agent was determined by computing the true specific gravity thereof at the compounding time. The value of the specific gravity of the expanded graphite shown in the column of "characteristic" was computed from the specific gravity of the molding. Table 4 also shows the property of each compounding agent.

In the comparison example 6, the components were mixed with one other at the same compounding ratio as that of the example 6 by using a Henschel mixer to form powder. The powder was compression-molded at a molding temperature of 240° C. and a molding pressure of 3 MPa. The specific gravity of the expanded graphite dispersed in the molding was 0.8. The molding was very brittle. Thus the gas duct was broken at the time of release thereof from the die. Therefore the melting viscosity could not be measured.

Because the specific gravity of the expanded graphite was small, the expanded graphite contained much gaseous matter therein. Therefore a crack was generated in a thinnest portion at the bottom of the gas duct.

Because the conductive resin molding of the comparison example 7 contained a large amount of the expanded graphite, the melting viscosity was so high that injection molding could not be accomplished.

In the comparison example 8, because the conductive carbon black was compounded in the resin composition, the thickening effect was outstandingly high. Thus neither fusing kneading nor injection molding could be accomplished.

Because the compounding amount of the expanded graphite contained in the conductive resin molding of the comparison example 9 was less than the predetermined compounding amount, a conductivity not more than $10^{-2}$Ω·cm order demanded for the solid polyelectrolytic separator was not obtained.

In the comparison example 10, because Ketjen black having a specific surface area out of the predetermined range and a particle diameter out of the predetermined range was used as the conductive compounding agent, the melting viscosity was so high that kneading could not be accomplished.

The molding of the comparison example 11 was made at a molding pressure of 15 MPa by compression molding. Because separators are multi-layered in the solid polyelectrolytic fuel cell, they are required to have a flatness of not more than 0.1 mm. The molding of the comparison example 11 contained the expanded graphite not having its specific gravity adjusted to not less than 1.8 and having an average particle diameter of not less than 50 μm. Therefore the molding was defective owing to generation of blisters and voids and thus did not satisfy the predetermined dimensional accuracy. Accordingly the molding cannot be used.

TABLE 3

| | Example | | | | | | | |
|---|---|---|---|---|---|---|---|---|
| | 6 | 7 | 8 | 9 | 10 | 11 | 12 | 13 |
| Compounding (vol %) | | | | | | | | |
| PP J-6083HP | 35 | 50 | 25 | — | 45 | 40 | 40 | 35 |
| S104 | — | — | — | 35 | — | — | — | — |
| Expandable graphite KEX | 65 | 50 | 75 | 65 | — | 54 | 42 | — |
| Expandable graphite EP | — | — | — | — | 49 | — | — | 65 |
| Carbon black #3030B | — | — | — | — | 6 | 6 | 18 | — |
| Properties | | | | | | | | |
| Expandable graphite | | | | | | | | |
| Average particle diameter, μπ | 17 | 17 | 17 | 17 | 95 | 17 | 17 | 95 |
| Particle size range of 80% of entirety, μm | 1~55 | 1~55 | 1~55 | 1~55 | 50~400 | 1~55 | 1~55 | 50~400 |
| Carbon black | | | | | | | | |
| Specific surface area, m²/g (BET method) | — | — | — | — | 29 | 29 | 29 | — |
| Primary particle diameter, nm | — | — | — | — | 55 | 55 | 55 | — |
| Characteristic | | | | | | | | |
| Specific gravity of expandable graphite | 2.2 | 2.0 | 1.8 | 2.2 | 2.1 | 2.2 | 2.2 | 2.1 |
| Resistivity, Ω·cm | $1.3 \times 10^{-3}$ | $5.6 \times 10^{-2}$ | $6.9 \times 10^{-3}$ | $1.2 \times 10^{-2}$ | $1.4 \times 10^{-2}$ | $1.4 \times 10^{-2}$ | $9.9 \times 10^{-3}$ | $1.2 \times 10^{-2}$ |
| Melting viscosity, Pa·s | 1230 | 370 | 2400 | 2560 | 2100 | 2140 | 2250 | 1190 |

TABLE 4

| | Cxomparison example | | | | | |
|---|---|---|---|---|---|---|
| | 6 | 7 | 8 | 9 | 10 | 11 |
| Compounding (vol %) | | | | | | |
| PP J-6083HP | 35 | — | 50 | 70 | 40 | 35 |
| S104 | — | 15 | — | — | — | — |
| Expandable graphite KEX | 65 | 85 | — | 30 | 54 | — |
| Expandable graphite EP | — | — | — | — | — | 65 |
| Carbon black EC-DJ600 | — | — | 50 | — | 6 | — |
| Properties | | | | | | |
| Expandable graphite | | | | | | |
| Average particle diameter, μπ | 17 | 17 | 95 | 17 | 17 | 95 |
| Particle size range of 80% of entirety, μm | 1~55 | 1~55 | 1~55 | 1~55 | 1~55 | 50~400 |
| Carbon black | | | | | | |
| Specific surface area, m²/g (BET method) | — | — | 1200 | — | 1200 | — |
| Primary particle diameter, nm | — | — | 30 | — | 30 | — |
| Characteristic | | | | | | |
| Specific gravity of expandable graphite | 0.8 | — | — | — | — | 1.2 |
| Resistivity, Ω·cm | $2 \times 10^{-2}$ | Unmoldable | Unmoldable | $1.7 \times 10$ | Unmoldable | $1.1 \times 10^{-2}$ |
| Melting viscosity, Pa·s | Unmeasurable | 5700 | Non-kneadable | 70 | Non-kneadable | Unmeasurable |

The second and third conductive resin moldings of the present invention contain the synthetic resin and the above-described first conductive compounding agent or the second conductive compounding agent or the mixture of the first conductive compounding agent or the second conductive compounding agent. Therefore the second and third conductive resin moldings sufficiently satisfy the characteristics of conductivity, unpermeability to gases, resistance to acids, resistance to corrosion, and mechanical strength demanded for the separator for the fuel cell.

It is possible to use any of an injection molding method, an injection molding method, an injection compression molding method; an injection press molding method, a transfer molding method, and a compression molding method. Therefore it is possible to reduce the yield of the material for the second and third conductive resin moldings and the production cost.

Examples 14 and 15

In the examples 14 and 15, the fourth conductive resin molding is formed as the separator for use in the fuel cell. The synthetic resin consisting of 25 vol % of J-6083HP (thermoplastic polypropylene resin) produced by Idemitsu Sekiyu Kagaku Inc. and 75 vol % of KS44 which is artificial graphite produced by LONZA Inc. were mixed with each other by using a Henschel mixer to form a resin composition to be molded. The mixture of the J-6083HP and the KS44 may be pelletized by fusing and kneading it with a biaxial kneader or a kneader.

By using a flash flow compression molder having the closing valve at its nozzle, the separator for use in the fuel cell was manufactured by setting a shearing speed to $5\times10^3$/s (example 14) and $5\times10^4$/s (example 15). The temperature of the resin composition of the injection cylinder was set to 240° C. The temperature of the die was set to 120° C. The thickness and length of one side of the separator-shaped die and the depth of the gas duct of the die were set to 2 mm, 180 mm, and 0.7 mm respectively. One surface (movable-side middle plate) of the square die whose one side was 180 mm can be moved forward and rearward to thereby adjust the volume of the cavity.

In the molding operation, initially the movable-side middle plate was moved rearward. The die was closed, with the volume of the cavity kept large. Then the resin composition was injected at the above-described shearing speed. When the cavity was filled with the resin composition, the closing valve of the nozzle portion was closed to move the movable-side middle plate forward. Thereby the volume of the cavity was reduced to 2 mm which was the predetermined thickness to compress the resin composition inside the cavity. When the resin composition was cooled sufficiently, the die was opened to take out the molded product from the die. In this manner, the separator for use in the fuel cell was obtained.

The appearance of the obtained separator for use in the fuel cell was visually checked. The resistivity (Ω·cm) was measured at an applied electric current of 100 mA by the four-probe method. Table 5 shows the results.

Comparison Example 12

Except that the volume of the cavity was initially set to 2 mm, the separator for the fuel cell was obtained in the same condition and method as those of the example 14. Evaluation was made on the separator in the same manner as that used in the example 14. Table 5 shows the results.

Comparison Example 13

Similarly to the manner used in the example 14, initially, the movable-side middle plate was moved rearward. The die was closed with the volume of the cavity kept large. With the closing valve of the nozzle portion kept open, the resin composition was injected at a shearing speed $1\times10^3$/s. When the cavity was filled with the resin composition, the closing valve of the nozzle portion was closed to move the movable-side middle plate forward. Attempts were made to reduce the volume of the cavity to 2 mm which was the predetermined thickness. But the resin composition could not be compressed. Thus the configuration of the separator for use in the fuel cell could not be obtained.

The conductive resin molding of each of the examples looked fine when the conductive resin moldings were visually checked. The resistivity (Ω·cm) of each conductive resin molding was satisfactory enough to be used as the separator for the fuel cell.

On the other hand, the resin composition of the conductive resin molding was not compressed after it was injected into the cavity of the die, the conductive resin molding was porous and had a high resistivity. In the comparison example 13, the resin composition was defectively filled into the cavity of the die. Thus the resistivity thereof could not be measured.

TABLE 5

|  | Example | | Comparison example | |
|---|---|---|---|---|
|  | 14 | 15 | 12 | 13 |
| Shearing speed (1/sec) | $5\times10^3$ | $5\times10^4$ | $5\times10^3$ | $1\times10^3$ |
| Die compression | Compressed | Compressed | Not compressed | Could not be compressed |
| Appearance | Good | Good | Porous | Defective filling |
| Resistivity (Ω·cm) | $1\times10^{-2}$ | $8\times10^{-3}$ | $1\times10^0$ | Unmeasurable |

The fourth conductive resin molding of the present invention is formed by molding the resin composition by using the flash flow compression molding method. Therefore even though the conductive resin molding contains the resin composition containing the conductive compounding agent at a high compounding ratio to satisfy a low electric resistance demanded for the separator for the fuel cell, no warp or contraction is generated. Consequently the separator obtained has a high dimensional accuracy. Further it is possible to obtain the separator, for the fuel cell, consisting of the molding which contains the conductive compounding agent uniformly dispersed in the resin, has a low gas permeability, and is dense.

INDUSTRIAL APPLICABILITY

The conductive resin molding of the present invention is superior in productivity and in conductivity, unpermeability to gases, resistance to acids, resistance to corrosion, and mechanical strength. Therefore the conductive resin molding is suitable as the separator for the fuel cell. By using the separator, it is possible to obtain a high-performance solid polyelectrolytic fuel cell.

What is claimed is:

1. A conductive resin molding formed by molding a resin composition comprising a conductive resin, and a high-boiling-point oil, wherein said resin composition contains 1 to 9 vol % of said high-boiling-point oil for an entirety of said resin composition, wherein said high-boiling point oil is at least one oil selected from the group consisting of fluorine-containing oil and polyphenyl ether oil.

2. A conductive resin molding according to claim 1, wherein said resin composition is thermoplastic resin composition.

3. A conductive resin molding, according to claim 1, which is a separator for use in a solid polyelectrolytic fuel cell that has groove portions formed on a surface of said separator so as to secure a flow path of hydrogen gas or air.

4. A conductive resin molding formed by molding a resin composition consisting of synthetic resin and a conductive compounding agent, wherein said conductive compounding agent contains a mixed conductive compounding agent of expanded graphite and carbon black; said carbon black has a specific surface area of 20 to 80 m$^2$/g measured by a BET method and has an average particle diameter of 40 to 100 nm; and said conductive compounding agent contains 10 to 40 vol % of said carbon black for an entirety of said mixed conductive compounding agent, wherein said expanded graphite is high-density expanded graphite prepared to have a specific gravity of 1.8 or more.

5. A conductive resin molding according to claim 4, wherein said expanded graphite contains iron and aluminum at less than 2500 ppm, sodium, at less than 1000 ppm, magnesium and calcium at less than 500 ppm as impurities.

6. A conductive resin molding according to claim 4, wherein said expanded graphite has an average particle diameter of 10 to 50 m.

7. A conductive resin molding according to claim 4, wherein said synthetic resin is thermoplastic resin.

8. A conductive resin molding, according to claim 4, which is a separator for use in a solid polyelectrolytic fuel cell that has groove portions formed on a surface of said separator so as to secure a flow path of hydrogen gas or air.

9. A conductive resin molding according to claim 1, wherein said resin molding is formed by molding said resin composition by using a flash flow compression molding method.

10. A conductive resin molding, according to claim 4, wherein said resin molding is formed by molding said resin composition by using a flash flow compression molding method.

11. A conductive resin molding, according to claim 9, which is a separator for use in a solid polyelectrolytic fuel cell that has groove portions formed on a surface of said separator so as to secure a flow path of hydrogen gas or air.

12. A conductive resin molding, according to claim 10, which is a separator for use in a solid polyelectrolytic fuel cell that has groove portions formed on a surface of said separator so as to secure a flow path of hydrogen gas or air.

13. A conductive resin molding according to claim 1, wherein said high-boiling-point oil is fluorine-containing oil.

14. A conductive resin molding according to claim 1, wherein said high-boiling-point oil is polyphenyl ether oil.

15. A conductive resin molding according to claim 14, wherein said polyphenyl ether oil has not less than three benzene rings.

16. A conductive resin molding according to claim 4, wherein said expanded graphite is high-density expanded graphite prepared to have a specific gravity of at least 1.8 and at most 2.2.

* * * * *